United States Patent [19]

Kurisu et al.

[11] Patent Number: 5,046,797
[45] Date of Patent: Sep. 10, 1991

[54] LIGHT BEAM SCANNER WITH FOREIGN MATTER REMOVING FEATURE

[75] Inventors: Akira Kurisu, Kanagawa; Kiyoshi Suzuki, Saitama, both of Japan

[73] Assignee: Fuji Photo Film Co., Ltd., Kanagawa, Japan

[21] Appl. No.: 322,872

[22] Filed: Mar. 14, 1989

[30] Foreign Application Priority Data

Mar. 15, 1988 [JP] Japan .................... 63-61239

[51] Int. Cl.⁵ .................. G02B 26/08; G03B 11/04
[52] U.S. Cl. .................... 350/6.8; 350/6.7; 350/587
[58] Field of Search ........... 350/3.71, 6.5, 6.9, 350/321, 6.7–6.8, 582, 587, 589–590

[56] References Cited

U.S. PATENT DOCUMENTS

| 4,367,912 | 1/1983 | Kitamura | 350/6.8 |
| 4,523,800 | 6/1985 | Yamashita et al. | 350/6.7 |
| 4,934,836 | 6/1990 | Tanaka et al. | 350/6.7 |

FOREIGN PATENT DOCUMENTS

| 38722 | 3/1984 | Japan | 350/6.8 |
| 152418 | 8/1984 | Japan | 350/6.8 |
| 67917 | 4/1985 | Japan | 350/6.7 |
| 231922 | 10/1987 | Japan | 350/6.7 |
| 196015 | 8/1989 | Japan | 350/6.7 |
| 196016 | 8/1989 | Japan | 350/6.7 |
| 196017 | 8/1989 | Japan | 350/6.7 |
| 196018 | 8/1989 | Japan | 350/6.7 |
| 201619 | 8/1989 | Japan | 350/6.7 |

OTHER PUBLICATIONS

Lambiotte et al., IBM-Technical Disclosure Bulletin, vol. 18, No. 6, pp. 1709-1710, Nov. 1975.

Primary Examiner—Bruce Y. Arnold
Assistant Examiner—Thong Nguyen
Attorney, Agent, or Firm—Sughrue, Mion, Zinn, Macpeak & Seas

[57] ABSTRACT

A light beam scanner which is adapted to reflect optical beams by a rotary polygonal mirror provided adjacent a free end portion of a rotary shaft which is supported rotatably by a bearing, thereby performing scanning, the rotary polygonal mirror is covered with a protective cover, the protective cover being provided with a gas-inlet opening capable of introducing gas into the inside of the protective cover and a gas-outlet opening with the rotary shaft loosely-fitted therein, the gas-outlet opening permitting a discharge of gas from the inside of the protection cover. Accordingly, any deposition of oil mist which may leak from the bearing on the rotary polygonal mirror can be prevented by producing a gas-flow stream which travels from the gas-inlet opening to the gas-outlet opening.

19 Claims, 4 Drawing Sheets

LIGHT BEAM SCANNER WITH FOREIGN MATTER REMOVING FEATURE

BACKGROUND OF THE INVENTION

1. Field of the Invention

The present invention relates to a light beam scanner apparatus which is adapted to successively reflect optical beams each reflecting off a mirror surface of a rotary polygonal mirror to perform scanning.

2. Description of the Related Art

A light beam scanner is conventionally used to reflect light beams emitted from a light beam source such as a laser utilizing a rotating polygonal mirror, thereby performing scanning.

To permit reading or recording of complex images a light beam scanner is required to use more scanning lines to increase resolution. For example, when a light beam scanner is employed in a recording apparatus, the beam diameter needs to be reduced. This permits the use of more scanning lines per frame and increases the number of resolution dots therefor.

In order to increase dots for the resolution within the same scanning time per frame compared to the conventional technique, it may be proposed that the outer diameter of the polygonal mirror is enlarged and the number of each reflecting mirror surface thereof is increased and a motor is driven at the same speed of revolution as the conventional one. There is however a spacial limitation on the outer diameter of the polygonal mirror when considering such an apparatus. In order to obtain high resolution without increasing the outer diameter of the polygonal mirror or retaining the conventional scanning time per frame it is necessary to increase the revolutionary speed of the polygonal mirror.

There are two types of motors, which have been useful in practice. One is a so-called outer rotor type in which its center shaft is fixed and the peripheral elements are rotated and the other is so-called inner rotor type in which its center shaft rotates.

The outer rotor type motor may be used to drive the polygonal mirror in some instances. This is because the deposition of lubricating oils corresponding to oil mist which may leak from a ball bearing provided between the central shaft and the rotatable outer elements on each reflecting mirror surface takes place to a lower degree compared to the latter inner rotor type motor.

With the outer rotor type motor, less reliability is however, expected at high speed rotation compared to the inner rotor type motor. Accordingly, it is preferable to choose an inner rotor type motor for a light beam scanner since it needs to rotate a polygonal mirror at very high speed.

However, when the inner rotor type motor is applied to the light beam scanner, the bearing from which the oil mist may leak approaches each reflection surface of the polygonal mirror. In particular, the high speed rotation of the polygonal mirror facilitates the deposition o, oils on each reflecting mirror surface. As a consequence, an inner rotor type motor brings about inconvenient influence upon the recording of images. A solution of such a problem has been to propose that a lubricating oil anti-deposition plate be provided between the bearing and the polygonal mirror as disclosed in Japanese Utility Model Application Laid Open No. 3513/1981. Such a structure, however, has to increase the number of components, and air resistance increases upon rotation of the polygonal mirror.

SUMMARY OF THE INVENTION

With the foregoing in view, it is a principal object of the present invention to provide a light beam scanning apparatus which prevents deposition of oil mist on each reflection surface of a polygonal mirror and doesn't require a longer scanning time per frame.

In one aspect of this invention, there is thus provided a light beam scanner which is adapted to reflect optical beams by using a rotary polygonal mirror provided adjacent to a free end portion of a rotary shaft which is supported rotatably by a bearing, thereby performing scanning. Said optical beam scanning apparatus comprises:

- at least one window for permitting entry and emission of optical beams therethrough;
- a gas-inlet opening provided on the side of the free end of the rotary shaft above the rotary polygonal mirror;
- a gas-outlet opening provided on the side of a basal portion of the rotary shaft below the rotary polygonal mirror; and
- a protection cover covering the rotary polygonal mirror, said rotary polygonal mirror comprising one hole in which the rotary shaft is loosely-fitted therein and a partition plate provided between the rotary polygonal mirror and the bearing.

In the light beam scanner according to this invention, a gas fed from the gas-inlet opening which is formed through the protection cover, is discharged from the gas-outlet opening. The oil mist or the like which may leak from the bearing therefore is prevented from reaching the reflecting mirror surfaces. As a consequence, any smear on each reflecting mirror surface can be prevented. In addition, any dust, particles or the like on the cover are discharged from the gas-outlet opening by the gas. The deposition of the dust, particles or the like on each reflecting mirror surface can therefore be prevented.

As has been described above, the present invention has brought about such excellent advantageous effects because the gas fed from the gas-inlet opening formed through the cover is discharged out through a hole formed in the partition plate alone. As a result, no oil mist or the like which may leak out of the bearing reaches each reflecting mirror surface, preventing any smear on the reflecting mirror surfaces. In addition, any dust, particles or the like on the cover are discharged through the hole by the gas, whereby the deposition of the dust and particles on each reflecting mirror surface can be prevented.

BRIEF DESCRIPTION OF THE DRAWINGS

The above and other objects, features and advantages of the present invention will become apparent from the following description and appended claims, taken in conjunction with the accompanying drawings, in which:

DETAILED DESCRIPTION OF THE INVENTION AND PREFERRED EMBODIMENTS

First Embodiment

Figure 1:
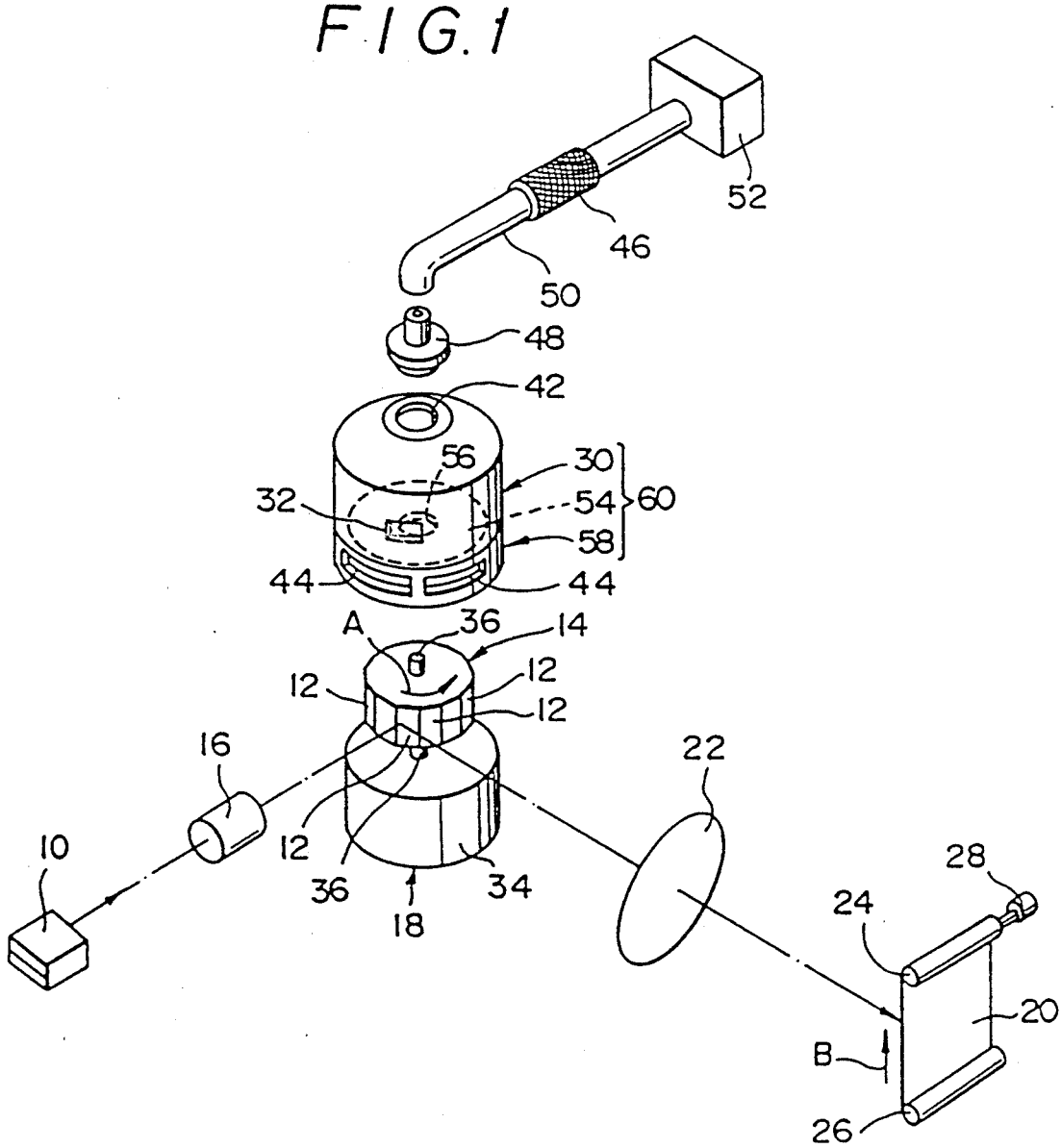
FIG. 1 diagrammatically shows an optical beam scanning apparatus according to a first embodiment of this invention.

FIG. 1 illustrates a light beam scanner according to a first embodiment of this invention, which is adapted to a recording apparatus by way of example.

A polygonal mirror 14 is provided with a plurality of reflecting mirror surfaces 12. A collimator lens 16 is interposed between the semiconductor laser 10 and the polygonal mirror 14.

The polygonal mirror 14 is driven about a rotary shaft 36 by the rotation of a motor 18 in the direction indicated by arrow A in FIG. 1. Light beams which pass through the collimator lens 16 are thus successively brought into a position where the plural reflecting mirror surfaces are opposed to the collimator lens 16 to receive light beams therefrom. Since the incident angles of the reflected optical beams vary successively in accordance with the rotation of the polygonal mirror 14, the reflecting direction varies correspondingly. This variation in the reflecting direction defines the direction of main scanning for writing information on a recording medium 20 disposed on the downstream side. As a recording medium 20, it is possible to use a recording material of the conventionally known heat mode type, that uses, as a recording layer, a material like a metallic thin film, which is capable of undergoing a thermal deformation such as fusion by high density energy such as, for example, a laser. It is also possible to use a recording material of a photosensitive type such as a silver salt type or a electrophotographic type.

An optical system 22 is interposed between the polygonal mirror 14 and the recording medium 20. The optical system 22 serves to converge optical beams reflected by the polygonal mirror 14 onto the recording medium 20. Namely, such a convergence permits a formation of dots on the recording medium 20.

Both end portions of the recording medium 20 are wound on take-up shafts 24 and 26, the former of which is provided with a rotary shaft of a stepping motor 28. The recording medium 20 is then wound in the direction indicated by arrow B in FIG. 1 by a driving force of the stepping motor 28.

The main scanning of the recording medium 20 is performed by the rotation of the polygonal mirror 14 as described above. However, upon completion of one main scanning,, in other words, whenever the scanning of each reflecting mirror surface has been completed, the recording medium 20 is wound to a predetermined extent in the direction indicated by arrow B in FIG. 1 owing to the driving force of the stepping motor 28. This is followed by subscanning. By repeatedly performing such scanning, information such as characters and images are recorded on the recording medium 20. Incidentally, subscanning may be practiced successively while allowing the stepping motor 28 to be rotated at a uniform rate. A typical example, of the above-described embodiment is a computer output microfilm, hereinafter called "COM", which is capable of recording information outputted from a computer.

Figure 2:
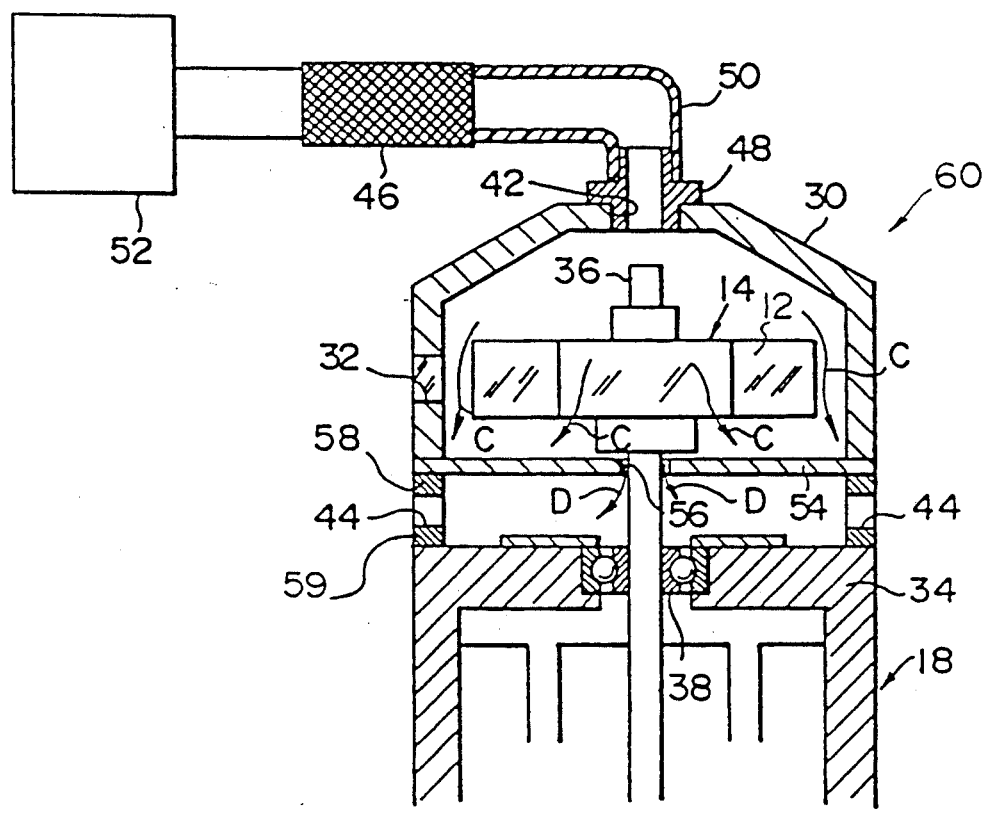
FIG. 2 is an enlarged view of a polygonal mirror and elements provided around the polygonal mirror.

As shown in FIG. 2, the polygonal mirror 14 is covered with a cover 60 which is constructed of an upper cover 30, a lower cover 58 and a partition plate 54 provided on an upper end face of the lower cover 58.

The deposition of dust and particles in the air on each reflecting mirror surface 12 is therefore prevented. The peripheral walls of the upper cover 30 are formed with a glass window 32 having a predetermined width, through which light beams pass.

A motor 18, of the so-called inner rotor type, is used for applying a rotating force to the polygonal mirror 14. The rotary shaft 36 extends out from a center portion of a motor main body 34. A base portion of the outwardly-extending portion of the rotary shaft 36 is supported rotatably by a ball bearing 38. The bearing 38 prevents the rotary shaft 36 from vibrating and serves to facilitate smooth rotation. The bearing 38 is filled with lubricating oil or grease.

An air inlet hole 42 which also functions as a gas-inlet opening is provided on an upper portion of the upper cover 30, said upper portion being in a position corresponding to an extending direction of the rotary shaft 36. A disc-shaped partition plate 54 provided on the lower cover 58 is fixedly secured on a lower end face of the upper cover 30. A circular hole 56 is formed as a gas-outlet opening through a center portion of the partition plate 54 and an intermediate portion of the rotary shaft 36. Hence, rotary shaft 36 is loose-fit. As a consequence, the polygonal mirror 14 is covered in its entirety by the cover 60. The difference in dimension between an outer diameter of the rotary shaft 36 and the diameter of the circular hole 56 ranges from approximately 0.25 to about 1.0 mm. Therefore, during rotation of the rotary shaft 36, the rotary shaft 36 is maintained free from interference with the inner peripheral edge of the circular hole 56. Air-outlet slots 44 are formed through substantially the entire peripheral wall of a cylindrical portion 59 which corresponds to a lower portion of the lower cover 58 interposed between the lower end face of the upper cover 30 and the motor 18 as viewed in FIG. 2.

One end portion of a hose 50 is mounted on the air inlet hole 42 via a connector 48 while the other end portion of the hose 50 is connected to a pump 52. As a consequence, the delivery side of the pump 52 is in communication with the inside of the upper cover 30. Accordingly, the air is delivered to the inside of the upper cover 30 via the hose 50 by a driving force of the pump 52. In addition, a filter 46 is interposed in an intermediate portion of the hose 50. Owing to passage of the air through the filter 46, dust and particles contained in the air to be fed into the inside of the upper cover 30 are removed.

The rotary shaft 36 is driven at high speed, for example, 12,000–30,000 rpm. and serves to rotate the polygonal mirror 14 which is fixedly secured to the intermediate portion of the rotary shaft 36. Owing to such rotation, oil mist leaks from the bearing 38. On the other hand, the air which passes through the filter 46 and is fed from the air inlet hole 42 reaches the partition plate 54 provided at a position lower than the reflecting mirror surface 12 as viewed in FIG. 2, namely, the air travelling along in the direction of arrow C in FIG. 2. The air then passes through the clearances between the circular hole 56 and the rotary shaft 36 thereby being discharged from the upper cover 30, namely, said air being discharged in the direction indicated by arrow D in FIG. 2. The air is then discharged through the air-outlet slot 44 formed in the lower cover 58 to the outside. Namely, the air flows in the above-described direction of arrow D only through the clearances between the circular hole 56 and the rotary shaft 36. Owing to the above direction of wind flow, the oil mist leaked from the bearing 38 is prevented from entering the inside of the upper cover 30 through the clearances, and instead, is guided to the air-outlet slot 44.

In addition, dust, particles or the like in the upper cover 30 are discharged through the clearances along the stream of air in the directions indicated by arrows C and D in FIG. 2.

The operation of this embodiment will hereinafter be described.

Laser beams which are emitted as an ON-OFF signal from a semiconductor laser 10 on the basis of a signal outputted from a computer or a magnetic memory, (not shown) enter the collimator lens 16, where collimation occurs. Said laser beams thereafter reach the polygonal mirror 14. Owing to the driving force of the motor 18, the polygonal mirror 14 is driven at high speed, for example, 12,000 to 30,000 rpm in the direction indicated by arrow A in FIG. 1. The direction of light beams reflected by the reflecting mirror surface 12 varies depending upon the incoming angle. Main scanning then occurs. Such light beams are converged upon the recording medium 20 through the optical system to form dots on the recording medium 20. When the dots thus formed are exposed to main scanning to complete one main scanning, the recording medium 20 is wound up in one step in the direction indicated by arrow B in FIG. 1 by the stepping motor 28 and the subscanning is carried out. By repeatedly performing the above operation, characters or the like are recorded on the recording medium 20 by a group of dots. Incidentally, the movement of the subscanning direction may be carried out successively. As an alternative, it is also possible to conduct subscanning by another optical system such as a vibrating mirror or the like while maintaining the recording medium 20 stationary.

In the present embodiment, the upper portion of the upper cover 30 is formed with the air inlet hole 42, to which the pump 52 is connected via the hose 50. Owing to the driving force of the pump 52, the air is actively fed into the inside of the upper cover 30 through the air inlet hole 42, whereby the wind flows in a downward direction as indicated by arrow C in FIG. 2.

Accordingly, all dust, particles or the like in the upper cover 30 travel along the stream of air in the direction of arrow C to reach the upper end face of the partition plate 54 as viewed in FIG. 2. The air is forcibly fed from the upper portion of the polygonal mirror 14. Accordingly, referring to arrow D in FIG. 2, the air delivered on the downstream side of the polygonal mirror 14 as viewed in FIG. 2 is discharged through the clearances between the rotary shaft 36 and the circular hole 56. As a consequence, the dust, particles or the like in the upper cover 30 are discharged outside the upper cover 30 without depositing such dust, particles or the like on each reflecting mirror surface or the inner peripheral wall of the glass window. Upon optical beam scanning or the like, the light is therefore neither reflected irregularly or blocked, whereby an appropriate recording or reading can be performed.

The air travels along the direction indicated by arrow D in FIG. 2 through the clearances between the circular hole 56 and the rotary shaft 36. The oil mist is therefore prevented from entering the inside of the upper cover 30 through the clearances owing to the above-described flowing direction of arrow D in FIG. 2 even when the oil mist may leak from the bearing 38 that is provided at a position lower than the clearances. The oil mist is then guided along the stream of air and discharged to the outside through the air-outlet slot 44. Accordingly, the reflecting mirror surface 12 nor the inner peripheral wall of the glass window 32 will be smeared by the oil mist. Incidentally, since the filter is interposed at an intermediate portion of the hose 50, dust, particles and the like contained in the air outside the cover are removed by this filter so that they are prevented from reaching the inside of the upper cover 30.

Incidentally, the partition plate 54 is provided on the lower end face of the upper cover 30 by way of example in the present embodiment. The partition plate 54 may, however, be provided on the upper end face of the lower cover 58 so as to be formed integrally with the lower cover 58.

In the above embodiment, the air inlet hole 42 is formed above the rotary shaft 36 and functions well so long as it is provided at a position above the polygonal mirror 14, namely, on the side of the tip of the rotary shaft 36.

Further, the air has been fed into the inside of the upper cover 30 by the pump 52 in the above embodiment. However, instead of the pump 52, another arrangement can be used where a cylinder of liquid nitrogen or the like is connected to feed a charge gas.

Incidentally, the image recorded on the microfilm is used after its enlargement and dots on the recording medium 20 need a resolution of 300 to 600 dots per mm in the aforementioned COM. The slightest smear on the reflection surface of the polygonal mirror, therefore, gives substantial influence on the quality of a resulting picture. When the light beam scanner according to the present invention is applied to a reading unit or a recording apparatus of the type such that no any slightest stain or dirt on the reflection mirror surface has to exist, and high density and high accuracy are required, particularly good effects can be brought about.

A description will further be made of another embodiment of this invention in which the air is fed from the outside of the cover by a swirling gas flow stream produced by the rotation of the polygonal mirror without forcibly feeding gas from a pump, cylinder, etc.

Second Embodiment

In the second embodiment of this invention, elements of structure identical to those in the first embodiment are indicated by like reference numerals and the description of its structure will be omitted herein.

Figure 3:
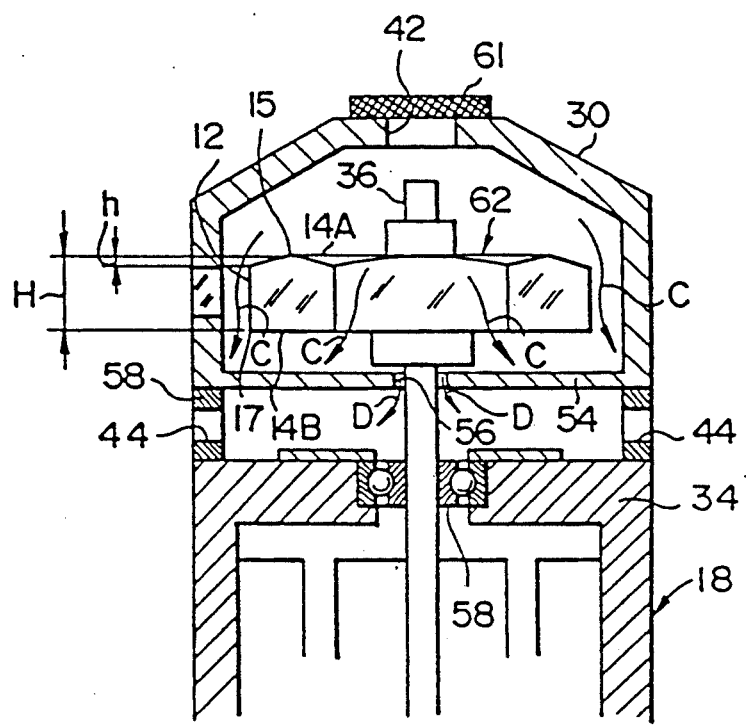
FIG. 3 is an enlarged view of a polygonal mirror according to a second embodiment of this invention.

As shown in FIG. 3, a first edge which corresponds to an edge 15 of a polygonal mirror 62 according to the second embodiment formed between each end face 14A provided on the side of the tip of a rotary shaft and each side face constituting the respective reflecting mirror surface 12 is chamfered, for example, at 2.5°. The width h of the chamfer may be set at 10 to 40%, preferably 20 to 30% of the width H of the polygonal mirror 14. Incidentally, a second edge which corresponds to an edge 17 formed between each end face 14B provided on the basal portion of the rotary shaft and each reflecting mirror surface 12 is not chamfered to the contrary. As a consequence, the swirling gas flow stream is guided outwardly toward the motor 18 as indicated by arrow C in FIG. 3. Namely, the air resistance of the chamfered edge 15 is reduced and becomes less than that of the non-chamfered edge 17. The flow rate of the wind at edge 17 is therefore faster than that at edge 15, so that a difference in pressure develops between the upstream side and the downstream side of each reflecting mirror surface 12. The direction of the swirling gas flow stream is changed by such differences in pressure in order to feed the air through the air inlet hole 42. In addition, the air inlet hole 42 is provided with a filter 61 so as to prevent dust, particles or the like from entering the inside of the upper cover 30.

The operation of the second embodiment will hereinafter be described.

In the second embodiment, the edge 15 between each end face 14A of the polygonal mirror 62 provided on the side of the tip portion of the rotary shaft and each reflecting mirror surface 12 is chamfered while the edge 17 between each end face 14B formed on the side of the basal portion of the rotary shaft and each reflecting mirror surface 12 is not chamfered. The swirling gas flow stream produced by the rotation of the polygonal mirror 62 is therefore guided outwardly as indicated by arrow C in FIG. 3. Namely, as the air resistance of the chamfered edge 15 is smaller, the swirling gas flow stream which develops upon rotation of the polygonal mirror 62 becomes slower. On the other hand, since the air resistance of the non-chamfered edge 17 is larger, the flow rate of the swirling gas flow stream becomes faster, whereby a difference in pressure develops between the upstream side and the downstream side of the reflecting mirror surfaces. Owing to such difference in pressure, the swirling gas flow stream can be guided along in the direction of arrow C in FIG. 3 so that the air is fed from the air inlet hole 42 to the inside of the upper cover 30. It is therefore unnecessary to provide the pump 52, employed in the first embodiment, whereby the number of components can be reduced. It is also possible to use the pump 52 in combination. In this case, the delivery capacity of the pump 52 may be reduced by a degree equivalent to the reduction in air resistance achieved owing to the guidance of the air by the chamfered edges.

Third Embodiment

Figure 4:
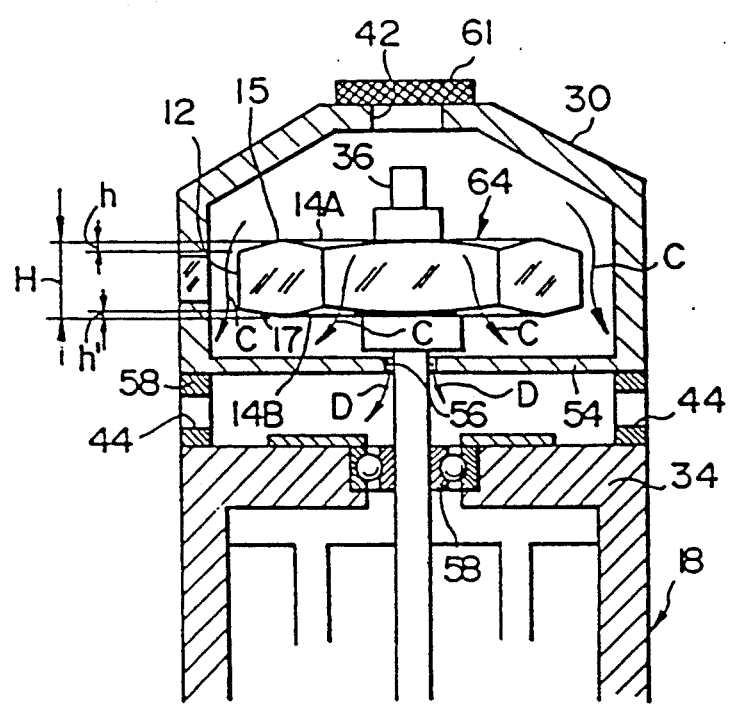
FIG. 4 is an enlarged view of a polygonal mirror according to a third embodiment of this invention.

The third embodiment of this invention will hereinafter be described with reference to FIG. 4. In the same manner as in the second embodiment, the description of elements of structure identical to those in the second embodiment will however be omitted herein.

An edge 15 of a polygonal mirror 64 provided on the side of a tip portion of a rotary shaft and an edge 17 of a polygonal mirror 64 formed on a side of a basal portion of the rotary shaft are both chamfered in the third embodiment. In this case, advantageous effects of this invention can be brought about under the following conditions.

Namely, the relation between the width h of chamfer of edge 15 and the width h' of the chamfer of edge 17 are determined to satisfy the inequality h>h'. When edge 17 of the polygonal mirror 64 formed on the side of the basal portion of the rotary shaft is chamfered at 2.5° by way of example, it is necessary to machine edge 15 into a chamfer larger than that of edge 17, for example at about 5°.

As a result, the air resistance of edge 15, which is chamfered larger than edge 17, becomes less than that of edge 17. The swirling gas flow stream is therefore guided outwardly as indicated by arrow C in FIG. 4. In the same manner as in the case of the chamfering of edge 15 alone, the air can be fed inside the upper cover 30 from the air inlet hole 42.

Incidentally, the chamfering of both edges 15 and 17 can bring about a smoother rotation by reducing the overall air resistance produced by the rotation of the polygonal mirror 62 as well as having the principal effect preventing the deposition of oil mist on each reflecting mirror surface 12.

What is claimed is:

1. An optical beam scanning apparatus, comprising:
    a rotary polygonal mirror adapted to reflect optical beams while being rotated by a rotary shaft supported rotatably by a bearing;
    a protective cover covering said rotary polygonal mirror, said protective cover including a gas-inlet opening for allowing gas to be introduced therethrough into the inside of said protective cover and a hole with the rotary shaft fitted loosely therein, said hole being provided between said bearing and said rotary polygonal mirror for permitting discharge of said gas from said inside of said protection cover; and
    a gas-introducing means disposed outside of said protective cover for introducing said gas into the interior of said protective cover through said gas-inlet opening.

2. An optical beam scanning apparatus as claimed in claim 1, wherein the gas-introducing means comprises a pump for feeding the gas into the inside of the protective cover through the gas-inlet opening.

3. An optical beam scanning apparatus as claimed in claim 1, wherein the gas-inlet opening is formed on a side opposite to a side on which the hole is formed.

4. An optical beam scanning apparatus as claimed in claim 3, wherein the rotary shaft is provided through a center axis of the rotary polygonal mirror.

5. A light beam scanner, comprising:
    a rotary polygonal mirror fixedly secured adjacent a free end portion of a rotary shaft supported by a bearing, said rotary polygonal mirror being adapted to reflect radiated light beams while being rotated by the rotary shaft, with the rotary shaft extending through a center axis of the rotary polygonal mirror, and having both end faces lying substantially perpendicular to the rotary shaft and a peripheral wall carrying thereon a plurality of mirrors for reflecting the light beams; a protective cover covering the rotary polygonal mirror, said protective cover defining an air inlet opening capable of introducing therethrough air into the inside of the cover, an air outlet hole in which a portion of the rotary shaft, said portion being between the bearing of the rotary shaft and the rotary polygonal mirror, is loosely-fitted, permitting discharge of air from the inside of the protective cover, and at least one window for allowing the light beams to travel therethrough to the rotary polygonal mirror and to come out therethrough subsequent to their reflection by the rotary polygonal mirror; and
    an air-introducing means for causing air to flow into the inside of the protection cover through the air inlet opening.

6. A light beam scanner as claimed in claim 5, wherein the air-introducing means comprises a pump for feeding air into the inside of the protective cover through the air inlet opening.

7. A light beam scanner as claimed in claim 5, wherein the air inlet opening is substantially provided opposite to an end portion of the rotary shaft on an imaginary extension of the central axis of the rotary shaft.

8. A light beam scanner as claimed in claim 5, wherein the air inlet opening is formed opposite to an end face of the rotary polygonal mirror, said end face being on the side of a free end of the rotary shaft.

9. A light beam scanner as claimed in claim 8, wherein the air introducing means comprises chambers formed between an end face of said rotary polygonal mirror and each face of peripheral wall of said rotary polygonal mirror, wherein said chamfers create a pressure differential between opposing end faces of said rotary polygonal mirror when rotated, thus causing a flow of air, said air being introduced into inside of said protective cover through said air inlet opening.

10. A light beam scanner as claimed in claim 9, wherein the chamfers are formed between the respective reflection mirror and an end face of the rotary polygonal mirror, said end face being on the side of the free end of the rotary shaft.

11. A light beam scanner as claimed in claim 9, wherein the chamfers are formed between the respective reflection mirrors and each of both end faces of the rotary polygonal mirror.

12. A light beam scanner as claimed in claim 9, wherein the air-introducing mean additionally comprises a pump for feeding air into the inside of the protective cover through the air inlet opening.

13. A protective cover for covering a rotary polygonal mirror provided adjacent an end portion of a rotary shaft supported rotatably by a bearing, comprising:
 a partition dividing said protective cover into an upper cover and a lower cover;
 a gas-inlet opening capable of allowing gas to be introduced into the inside of said upper cover;
 a gas outlet hole in said partition in which a portion of the rotary shaft, said potion being between the bearing of the rotary shaft and the rotary polygonal mirror, is loosely-fitted, permitting a discharge of gas from the inside of said upper cover; and
 gas outlet slots in wall of lower cover for allowing said gas to escape to outside.

14. A protective cover as claimed in claim 13, wherein the gas-inlet opening is formed on a side closer to the end portion of the rotary shaft than to the rotary polygonal mirror when the protective cover is applied to the light beam scanner.

15. A protective cover as claimed in claim 14, comprising at least one window for permitting entry and emission of light beams therethrough.

16. An optical beam scanning apparatus, comprising:
 a rotary polygonal mirror adapted to reflect optical beams while being rotated by a rotary shaft supported rotatably by a bearing, thereby performing scanning of a source of said optical beams; and
 a protective cover covering said rotary polygonal mirror, said protective cover defining a gas-inlet opening capable of allowing gas to be introduced therethrough into the inside of said protective cover and a hole with the rotary shaft fitted loosely therein, said hole being provided between said bearing and said rotary polygonal mirror and permitting discharge of said gas from said inside of said protection cover; and
 a gas-introducing means comprising chamfers formed between an end face of said rotary polygonal mirror and each face of peripheral wall of said rotary polygonal mirror, wherein said chamfers create a pressure differential between opposing end faces of said rotary polygonal mirror when rotated, thus causing a flow of gas, said gas being introduced into inside of said protective cover through said gas-inlet opening.

17. An optical beam scanning apparatus as claimed in claim 16, wherein the chamfers are formed between the respective reflection mirrors and an end face of the prism-shaped body, said end face being farther from the hole.

18. An optical beam scanning apparatus as claimed in claim 16, wherein the chamfers are formed between the respective reflecting mirrors and each of both end faces of the prism-shaped body.

19. An optical beam scanning apparatus, comprising:
 a rotary polygonal mirror adapted to reflect optical beams while being rotated by a rotary shaft supported rotatably by a bearing, thereby performing scanning of a source of said optical beams; and
 a protective cover covering said rotary polygonal mirror, said protective cover defining a gas-inlet opening capable of allowing gas to be introduced therethrough into the inside of said protective cover and a hole with the rotary shaft fitted loosely therein, said hole being provided between said bearing and said rotary polygonal mirror and permitting discharge of said gas from said inside of said protection cover; and
 a gas-introducing means comprising chamfers formed between both end faces of said rotary polygonal mirror and each face of peripheral wall of said rotary polygonal mirror, wherein said chamfers create a pressure differential between opposing end faces of said rotary polygonal mirror when rotated, thus causing a flow of gas, said gas being introduced into inside of said protective cover through said gas-inlet opening.

* * * * *